United States Patent
Uchida

(10) Patent No.: US 8,685,149 B2
(45) Date of Patent: Apr. 1, 2014

(54) FUEL TANK FOR VEHICLE

(75) Inventor: Noboru Uchida, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 38 days.

(21) Appl. No.: 13/581,741

(22) PCT Filed: Mar. 11, 2011

(86) PCT No.: PCT/JP2011/001433
§ 371 (c)(1),
(2), (4) Date: Aug. 29, 2012

(87) PCT Pub. No.: WO2011/114676
PCT Pub. Date: Sep. 22, 2011

(65) Prior Publication Data
US 2012/0318793 A1    Dec. 20, 2012

(30) Foreign Application Priority Data
Mar. 16, 2010 (JP) ................. 2010-058622

(51) Int. Cl.
*B01D 53/22* (2006.01)

(52) U.S. Cl.
USPC ............ 96/4; 95/43; 95/45; 95/51; 220/4.14; 220/4.15; 220/4.12; 220/581; 220/562

(58) Field of Classification Search
USPC ............... 95/43, 45, 51; 96/4; 220/4.12, 4.14, 220/4.15, 562, 581
See application file for complete search history.

(56) References Cited

U.S. PATENT DOCUMENTS

| 6,296,686 | B1 * | 10/2001 | Prasad et al. | 95/51 |
| 6,579,331 | B1 * | 6/2003 | Ho | 48/198.3 |
| 7,601,202 | B2 * | 10/2009 | Noack et al. | 95/51 |
| 7,713,332 | B2 * | 5/2010 | Bronold | 95/51 |
| 8,088,197 | B2 * | 1/2012 | Wright et al. | 95/51 |
| 8,273,160 | B2 * | 9/2012 | Wright et al. | 96/4 |
| 2006/0068271 | A1 * | 3/2006 | Ren et al. | 429/44 |
| 2012/0111192 | A1 * | 5/2012 | Nazarko et al. | 95/51 |

FOREIGN PATENT DOCUMENTS

| EP | 1826853 A1 * | 8/2007 |
| JP | 62 149580 | 7/1987 |
| JP | 5 35441 | 5/1993 |
| JP | 9 193674 | 7/1997 |
| JP | 2006 193127 | 7/2006 |
| JP | 2008 286033 | 11/2008 |
| JP | 2010 36123 | 2/2010 |
| JP | 2010 248928 | 11/2010 |

OTHER PUBLICATIONS

Minoru et al. JP09-193674 Machine Translation, Jul. 29, 1997.*
Ryutaro JP2006-193127 Machine Translation Jul. 27, 2006.*
International Search Report issued Jun. 7, 2011 in PCT/JP11/001433 Filed Mar. 11, 2011, pp. 1-2.

* cited by examiner

Primary Examiner — Jason M Greene
Assistant Examiner — Anthony Shumate
(74) Attorney, Agent, or Firm — Oblon, Spivak, McClelland, Maier & Neustadt, L.L.P.

(57) ABSTRACT

A breather 2 on a top of a tank body 1 is opened through a carbon dioxide permeable membrane 3 to an atmospheric air so as to take an inert gas containing plenty of carbon dioxide permeated through the membrane 3 into the tank body 1 by a negative pressure due to reduction of a fuel F in the tank body 1.

6 Claims, 2 Drawing Sheets

FUEL TANK FOR VEHICLE

TECHNICAL FIELD

The present invention relates to a fuel tank for a vehicle.

BACKGROUND ART

In recent years, a bio-diesel fuel made from biological oils attracts attentions as one of countermeasures against global warming. Utilized are various fats such as colza oil in Europe, *Pistacia chinensis* and the like in China, soybean oil in North, Central and South America and oil palm, coconut palm and *Jatropha curcas* in Southeast Asia.

There is concern that direct use of such fats, which have a feature of high viscosity among others, as they are as fuel for a diesel automobile would cause failure of an engine due to adhesion of deposits on a fuel pump. Thus, used is fatty acid methyl ester (abbreviated as FAME using initials) or the like with physical properties similar to those of diesel oil and obtained through conversion of the raw fats by removing glycerin therefrom in a chemical treatment such as methyl esterification.

More specifically, the fats are added with methanol and a catalyst to cause an ester exchange reaction. The resultant material is added with an acid to perform neutralization and is separated into FAME and glycerin. The separated FAME is washed with water for removal of the catalyst and is distilled for removal of methanol to obtain a biodiesel fuel.

This kind of biodiesel fuel has a feature of being easily oxidized in the presence of oxygen. When a vehicle with the biodiesel fuel in its fuel tank is left unused for a long time, the fuel in the tank may proceed to oxidization and deterioration to corrode the tank and/or produce polymers to cause clogging in fuel injection and lubricating systems, resulting in serious damages to the engine. Thus, countermeasures against oxidation of a biodiesel fuel in a fuel tank have been demanded.

There exists a conventional technique, for example, in the following Patent Literature 1 that nitrogen-rich air is supplied from a nitrogen gas cylinder to a fuel tank to lower a concentration of oxygen in the tank. In Patent Literature 1, air is separated into oxygen- and nitrogen-rich airs by an oxygen/nitrogen separator with an oxygen enrichment membrane and the nitrogen-rich air is accumulated in the nitrogen gas cylinder.

CITATION LIST

Patent Literature

[Patent Literature 1] JP 2008-286033A

SUMMARY OF INVENTION

Technical Problems

However, such conventional art requires large-scale equipment components such as an oxygen/nitrogen separator, a nitrogen gas cylinder (and an oxygen gas cylinder) and a piping system, which may impair vehicle mountability. Furthermore, energy required for operation of the equipment components may deteriorate fuel efficiency.

The invention was made in view of the above and has its object to make it possible to reliably keep an interior of a tank body in an inert atmosphere without impairing vehicle mountability and without requiring an energy consumption which deteriorates fuel efficiency.

Solution to Problems

The invention is directed to a fuel tank for a vehicle characterized in that a breather on a top of a tank body is opened through a carbon dioxide permeable membrane to an atmospheric air so as to take an inert gas containing plenty of carbon dioxide permeated through said membrane into the tank body by a negative pressure due to reduction of a fuel in the tank body.

This causes carbon dioxide in the air to be selectively taken through the carbon dioxide permeable membrane of the breather into the tank body when the fuel reduces to cause the negative pressure in the tank body. Thus, a gas-phase portion in the tank body is filled with the inert gas containing plenty of carbon dioxide and an interior of the tank body is kept in an inert atmosphere to suppress the fuel from being oxidized.

More specifically, the interior of the tank body is kept in the inert atmosphere without requiring large-scale equipment components such as an oxygen/nitrogen separating device, a nitrogen gas cylinder (and an oxygen gas cylinder) and a piping system. Moreover, the filling of the tank body with the inert gas containing plenty of carbon dioxide is conducted without motive power by use of the negative pressure due to the reduction of the fuel in the tank body.

It is preferable in the invention that the carbon dioxide permeable membrane is cylindrically formed to secure an air flow path centrally of the cylindrical membrane and that a carbon dioxide collecting chamber is formed on an outer periphery of said cylindrical membrane and is connected with the breather.

Such cylindrical formation of the carbon dioxide permeable membrane can widen a permeable area of the membrane with an outer shape of the membrane being compact in size, and allows air to freely come into and out of the flow path centrally of the cylindrical membrane to facilitate replacement of the air in said flow path with new air.

In the invention, a vacuum pump may be also provided at the top of the tank body to suck and discharge a gas in the tank body through a check valve, which makes it possible to actively increase the negative pressure in the tank body by operating the vacuum pump to thereby improve recovery efficiency of carbon dioxide.

For example, air may invade the tank body during supply of the fuel through a fuel cap opened. Thus, after the supply of the fuel, the fuel cap is closed and the vacuum pump is operated to actively increase the negative pressure in the tank body to thereby improve recovery efficiency of carbon dioxide and purge a residual oxygen in the tank body in a short time.

The provision of the vacuum pump is preferably accompanied by provision of an opening/closing detecting means for detecting opening/closing of the fuel cap for closure of a fuel supply port of the tank body, a level meter for detecting a level of the fuel in the tank body and a controller for receiving signals from said level meter and said opening/closing detecting means to measure a gas amount in the tank body when said fuel cap is opened and for operating the vacuum pump on the basis of a measured value to keep the interior of the tank body in an inert atmosphere when said fuel cap is closed.

Thus, the gas amount in the tank body is measured by the controller when the fuel cap is opened, and the vacuum pump is operated by the controller on the basis of the measured value when the fuel cap is closed, thereby automatically purging the residual oxygen in the tank body.

Carbon dioxide, which is heavier than air unlike nitrogen, hardly diffuses into the atmospheric air even if the fuel cap is opened during the supply of the fuel, and an amount of residual oxygen in the tank body is considered to be a little. Thus, the vacuum pump need not be operated to replace all the gas in the tank body; it suffices that, with the measured gas amount being used as a rough standard, the controller instructs the pump on a minimum operation time required for keeping the inert atmosphere in the tank body.

Advantageous Effects of Invention

According to a fuel tank for a vehicle of the invention, various excellent advantages can be obtained as follows.

(I) The interior of the tank body can be kept in an inert atmosphere without requiring large-scale equipment components such as an oxygen/nitrogen separating device, a nitrogen gas cylinder (and an oxygen gas cylinder) and a piping system. Moreover, the filling of the tank body with an inert gas containing plenty of carbon dioxide can be conducted without motive power by use of the negative pressure due to reduction of the fuel in the tank body, so that the interior of the tank body can be reliably kept in an inert atmosphere without impairing vehicle mountability and without requiring an energy consumption which deteriorates fuel efficiency.

(II) Construction may be such that the carbon dioxide permeable membrane is cylindrically formed to secure an air flow path centrally of the cylindrical membrane and a carbon dioxide collecting chamber is formed on the outer periphery of the cylindrical membrane and is connected with the breather. Such cylindrical formation of the carbon dioxide permeable membrane can widen a permeable area of the membrane with an outer shape of the membrane being compact in size, and allows air to freely come into and out of the flow path centrally of the cylindrical membrane to facilitate replacement of the air in the flow path with new air.

(III) Configuration may be employed which includes a vacuum pump at the top of the tank body to suck and discharge the gas in the tank body through the check valve. Then, the vacuum pump can be operated to actively increase the negative pressure in the tank body so as to improve recovery efficiency of carbon dioxide. Thus, even if air invades the tank body during the supply of the fuel with the fuel cap being opened, the vacuum pump is operated with the fuel cap being closed after the supply of the fuel to improve the recovery efficiency of carbon dioxide, thereby purging residual oxygen in the tank body in a short time.

(IV) Configuration may be employed which includes the opening/closing detecting means for detecting opening/closing of the fuel cap for closure of the fuel supply port of the tank body, the level meter for detecting a level of the fuel in the tank body and the controller for receiving signals from the level meter and the opening/closing detecting means to measure a gas amount in the tank body when the fuel cap is opened and for operating the vacuum pump to keep the interior of the tank body in an inert atmosphere when the fuel cap is closed. Then, the gas amount in the tank body is measured by the controller when the fuel cap is opened, and the vacuum pump is operated on the basis of the measurement value by the controller when the fuel cap is closed, thereby automatically purging residual oxygen in the tank body.

DESCRIPTION OF EMBODIMENT

An embodiment of the invention will be described with reference to the drawings.

Figure 1:
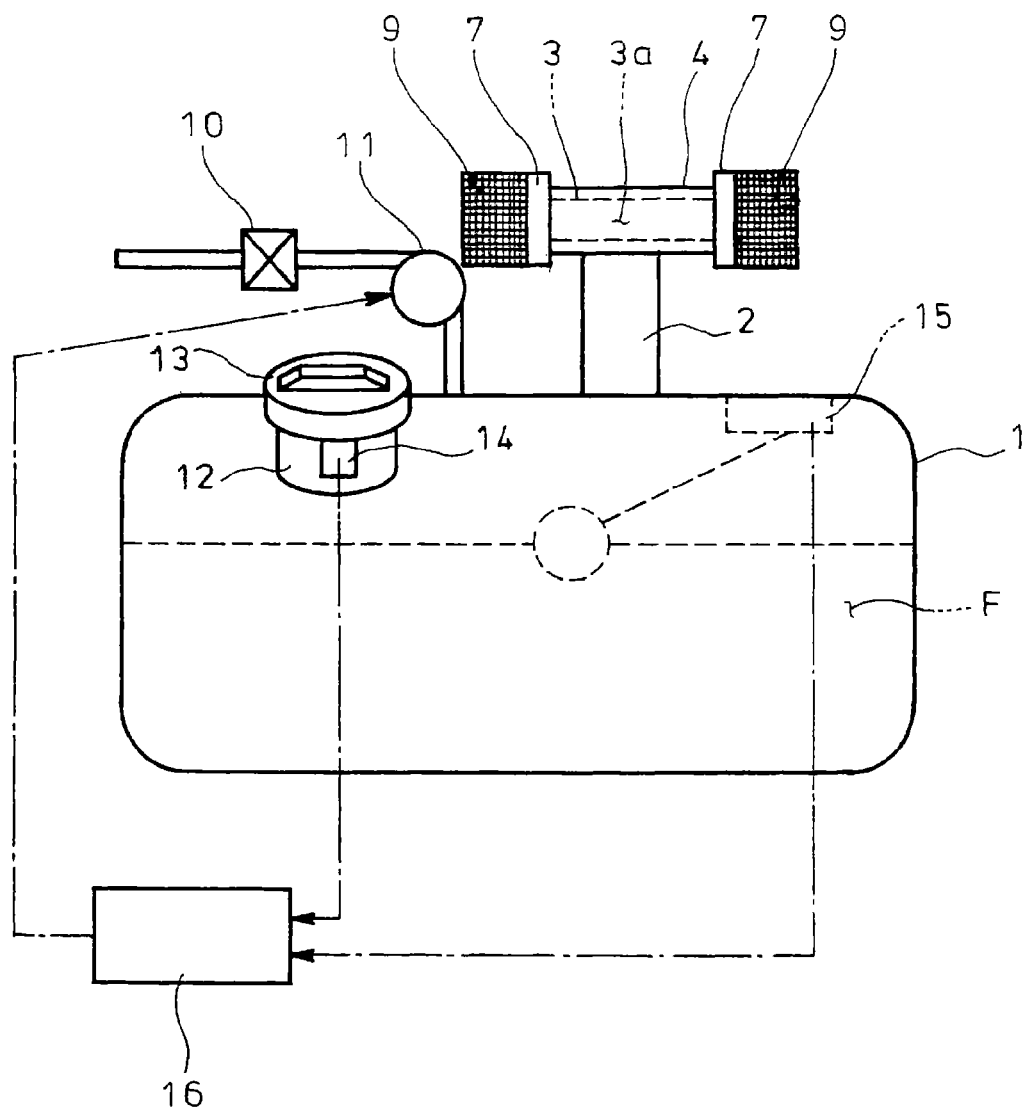
FIG. 1 is a schematic diagram showing an embodiment of the invention.
Figure 2:
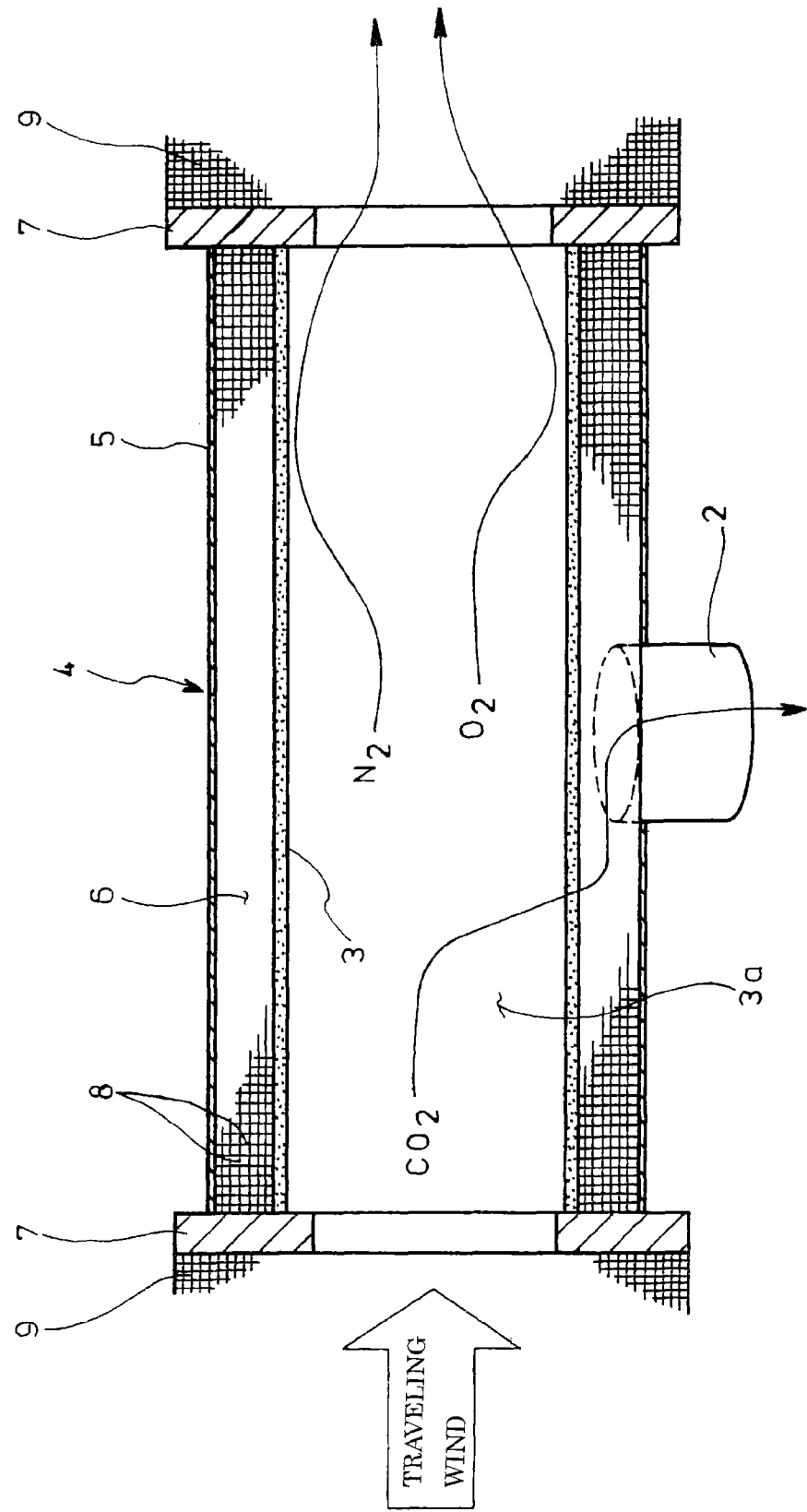
FIG. 2 is a sectional view showing details of a carbon dioxide permeable membrane and a carbon dioxide collecting chamber in FIG. 1.

FIGS. 1 and 2 show an embodiment of the invention. In the embodiment illustrated, a breather 2 on a top of a tank body 1 is open to an atmospheric air through a carbon dioxide permeable membrane 3 such that an inert gas containing plenty of carbon dioxide permeated through the membrane 3 can be taken into the tank body 1 by a negative pressure due to reduction of the fuel F in the tank body 1. More specifically, the membrane 3 is cylindrically formed to secure an air flow path 3a centrally of the cylindrical membrane, and a carbon dioxide collecting chamber 4 is formed on an outer periphery of the cylindrical membrane 3 and is connected with the breather 2.

The chamber 4 is defined by a cylindrical outer shell 5 coaxially surrounding the cylindrical membrane 3 with a required distance and torus-shaped blocking plates 7 closing a space 6 between the outer shell 5 and the membrane 3 at longitudinally opposite ends. Interposed in the space 6 is a ventilating buffer 8 made of, for example, wire mesh so as to hold the space 6 with no distortion of the membrane 3 even if a pressure difference occurs.

Employable as the carbon dioxide permeable membrane 3 is, for example, a Cardo polyimide polymer membrane (made from coal tar) having an already confirmed effect on carbon dioxide separation. However, this type of membrane 3 will deteriorate in function due to dust or the like in the air, so that air filters 9 capable of removing the dust in the air are arranged outside the blocking plates 7 such that only clean air passing through the air filters 9 is guided to the flow path 3a centrally of the cylindrical membrane 3.

It is preferable that the flow path 3a centrally of the cylindrical membrane 3 is configured to always receive replacement of air with new air. Thus, the flow path 3a is preferably arranged in a direction to easily take a stream or traveling wind of a vehicle into the flow path 3a such that the flow path 3a is scavenged with the traveling wind.

In the embodiment, a vacuum pump 11 is disposed at the top of the tank body 1 to suck and discharge the gas in the tank body 1 through a check valve 10. Further arranged are a micro switch 14 (opening/closing detecting means) which detects opening/closing of a fuel cap 13 closing a fuel supply port 12 of the tank body 1, a float type level meter 15 which detects a level of the fuel F in the tank body 1 and a controller 16 which receives signals from the level meter 15 and the micro switch 14 to control an operation of the vacuum pump 11.

The controller 16 is configured to measure a gas amount in the tank body 1 on the basis of the signals from the level meter 15 and the micro switch 14 upon opening of the fuel cap 13 and control to operate the vacuum pump 11 on the basis of the measured gas amount, upon closing of the cap 13, such that an interior of the tank body 1 can be kept in an inert atmosphere.

Thus, when the fuel F reduces to make the pressure in the tank body 1 negative, carbon dioxide in the air is selectively taken through the carbon dioxide permeable membrane 3 of the breather 2 and a gas-phase portion in the tank body 1 is filled with inert gas containing plenty of carbon dioxide such that the interior of the tank body 1 is kept in an inert atmosphere to suppress the fuel F from being oxidized.

More specifically, the interior of the tank body 1 is kept in the inert atmosphere without requiring large-scale equipment components such as an oxygen/nitrogen separating device, a nitrogen gas cylinder (and an oxygen gas cylinder) and a piping system. The filling of the tank body 1 with the inert gas containing plenty of carbon dioxide is conducted without motive power by use of a negative pressure due to reduction of the fuel F.

When the fuel F is supplied to the tank body 1 and opening of the fuel cap 13 is detected by the controller 16 on the basis of a signal from the micro switch 14, a gas amount in the tank body 1 is measured on the basis of a level of the fuel F determined by a signal from the level meter 15 at this time. When closing of the fuel cap 13 is detected by the controller 16 on the basis of the signal from the micro switch 14 after the supply of the fuel F, the vacuum pump 11 is operated for a required time by the controller 16 on the basis of the measured gas amount such that the inert atmosphere in the tank body 1 can be kept, thereby automatically purging residual oxygen in the tank body 1.

Carbon dioxide, which is heavier than air unlike nitrogen, hardly diffuses into the atmospheric air even if the fuel cap 13 is opened during the supply of the fuel F, and an amount of residual oxygen in the tank body 1 is considered to be a little. Thus, the vacuum pump 11 need not be operated to replace all the gas in the tank body 1; it suffices that, with the measured gas amount being used as an indicator, the controller 16 instructs the pump on a minimum operation time required for keeping the inert atmosphere in the tank body 1.

Thus, according to the embodiment, the interior of the tank body 1 can be kept in an inert atmosphere without requiring large-scale equipment components such as an oxygen/nitrogen separating device, a nitrogen gas cylinder (and an oxygen gas cylinder) and a piping system. The filling of the tank body 1 with an inert gas containing plenty of carbon dioxide can be conducted without motive power by use of the negative pressure due to reduction of the fuel F, so that the interior of the tank body 1 can be reliably kept in an inert atmosphere without impairing vehicle mountability and without requiring an energy consumption which deteriorates fuel efficiency.

Furthermore, the cylindrical formation of the carbon dioxide permeable membrane 3 can widen a permeable area of the membrane 3 with an outer shape of the membrane 3 being compact in size, and allows air to freely come into and out of the flow path 3a centrally of the cylindrical membrane 3 to facilitate replacement of the air in the flow path 3a with new air.

The vacuum pump 11 can be operated to actively increase the negative pressure in the tank body 1 so as to improve recovery efficiency of carbon dioxide. Thus, even if air comes into the tank body 1 during the supply of the fuel F with the fuel cap 13 being opened, the vacuum pump 11 is operated with the fuel cap 13 being closed after the supply of the fuel F to improve the recovery efficiency of carbon dioxide, thereby purging residual oxygen in the tank body 1 in a short time. In addition, the operation is automatically conducted by the controller 16 through detection of opening/closing of the fuel cap 13 with the micro switch 14.

It is to be understood that a fuel tank for a vehicle according to the invention is not limited to the above embodiment and that various changes and modifications may be made without departing from the scope of the invention.

REFERENCE SIGNS LIST 1 tank body
2 breather
3 carbon dioxide permeable membrane
3a flow path
4 carbon dioxide collecting chamber
10 check valve
11 vacuum pump
12 fuel supply port
13 fuel cap
14 micro switch (opening/closing detecting means)
15 level meter
16 controller
F fuel

The invention claimed is:

1. A fuel tank for a vehicle comprising a breather on a top of a tank body opened through a carbon dioxide permeable membrane to an atmospheric air so as to take an inert gas containing plenty of carbon dioxide permeated through said membrane into the tank body by a negative pressure due to reduction of a fuel in the tank body.

2. The fuel tank for the vehicle as claimed in claim 1, wherein the carbon dioxide permeable membrane is cylindrically formed to secure an air flow path centrally of the cylindrical membrane and a carbon dioxide collecting chamber is formed on an outer periphery of said cylindrical membrane and is connected with the breather.

3. The fuel tank for the vehicle as claimed in claim 1 further comprising a vacuum pump at the top of the tank body to suck and discharge a gas in the tank body through a check valve.

4. The fuel tank for the vehicle as claimed in claim 2 further comprising a vacuum pump at the top of the tank body to suck and discharge a gas in the tank body through a check valve.

5. The fuel tank for the vehicle as claimed in claim 3 further comprising an opening/closing detecting means for detecting opening/closing of a fuel cap for closure of a fuel supply port of the tank body, a level meter for detecting a level of the fuel in the tank body and a controller for receiving signals from said level meter and said opening/closing detecting means to measure a gas amount in the tank body when said fuel cap is opened and for operating the vacuum pump on the basis of a measured value to keep the interior of the tank body in an inert atmosphere when said fuel cap is closed.

6. The fuel tank for the vehicle as claimed in claim 4 further comprising an opening/closing detecting means for detecting opening/closing of a fuel cap for closure of a fuel supply port of the tank body, a level meter for detecting a level of the fuel in the tank body and a controller for receiving signals from said level meter and said opening/closing detecting means to measure a gas amount in the tank body when said fuel cap is opened and for operating the vacuum pump on the basis of a measured value to keep the interior of the tank body in an inert atmosphere when said fuel cap is closed.

* * * * *